(12) United States Patent
Dixon et al.

(10) Patent No.: US 6,981,166 B2
(45) Date of Patent: Dec. 27, 2005

(54) METHOD, APPARATUS, AND COMPUTER PROGRAM PRODUCT FOR PACING CLOCKED OPERATIONS

(75) Inventors: Robert Christopher Dixon, Austin, TX (US); Alan Grant Singletary, Austin, TX (US); Barry Joe Wolford, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 704 days.

(21) Appl. No.: 10/042,104

(22) Filed: Jan. 7, 2002

(65) Prior Publication Data

US 2003/0131276 A1   Jul. 10, 2003

(51) Int. Cl.[7] ............................................. G06F 1/04
(52) U.S. Cl. ..................................... 713/500; 713/400
(58) Field of Search ................................. 713/400, 500

(56) References Cited

U.S. PATENT DOCUMENTS

| | | | | |
|---|---|---|---|---|
| 4,876,700 A | * | 10/1989 | Grindahl | 375/333 |
| 5,710,517 A | * | 1/1998 | Meyer | 327/163 |
| 5,712,826 A | * | 1/1998 | Wong et al. | 365/226 |
| 5,761,476 A | * | 6/1998 | Martell | 712/219 |
| 5,870,578 A | * | 2/1999 | Mahalingaiah et al. | 712/215 |
| 6,014,512 A | * | 1/2000 | Mohamed et al. | 703/27 |
| 6,125,078 A | * | 9/2000 | Ooishi et al. | 365/233 |
| 6,263,430 B1 | * | 7/2001 | Trimberger et al. | 713/1 |
| 6,417,707 B1 | * | 7/2002 | Underhill et al. | 327/165 |
| 6,553,484 B1 | * | 4/2003 | Sawamura | 712/217 |
| 6,563,349 B2 | * | 5/2003 | Menezes et al. | 327/99 |
| 6,816,961 B2 | * | 11/2004 | Rice et al. | 712/223 |

* cited by examiner

Primary Examiner—Lynne H. Browne
Assistant Examiner—Tse Chen
(74) Attorney, Agent, or Firm—Robert M Carwell; Anthony V. S. England (57) ABSTRACT

In one aspect, a method for performing clocked operations in a device includes performing, in a device, first and second operations responsive to a clock having a primary frequency f. The device is capable of performing the operations within X and Y cycles of the clock, respectively. X cycles of the clock correspond to a time interval T1 with the clock operating at the frequency f, and, accordingly, the device is capable of performing X/Y instances of the second operation within time interval T1 with the clock operating at the frequency f. During the time interval T1 at least one extra cycle of the clock is generated to reduce performance time for the first operation. An affect of the at least one extra cycle is masked with respect to the second operation, so that instances of the second operation during the interval T1 remain no greater in number than X/Y.

15 Claims, 6 Drawing Sheets

METHOD, APPARATUS, AND COMPUTER PROGRAM PRODUCT FOR PACING CLOCKED OPERATIONS

BACKGROUND

1. Field of the Invention

This invention relates generally to clocked operations in electronic devices, and more particularly to managing timing of performance of these operations.

2. Related Art

Because it is expensive to set up fabrication of integrated circuit ("IC") chips, and because chips having huge numbers of transistors are complicated and subject to design glitches, it is common when designing a chip to extensively test an emulated version of the chip before fabrication. Furthermore, it is quite common for chips to interface with one another. In emulation and testing, the emulated version of a chip under development may be interfaced with and tested together with another, actual IC chip.

In order for IC chips to properly work together, the chips often send or receive an external clock for synchronizing and for generating an internal clock. The internal clock typically uses a phase locked loop ("PLL") to run at a higher speed than the external clock, such as twice ("2×") the external clock frequency, for example. For emulation and testing, the maximum clock speed at which the emulated chip is capable of operating is very slow in comparison with the operating frequency of the actual chip. Consequently, the external clock, which serves as a reference to both the emulated and actual chips, must run so slowly that the internal clocks for the chips cannot be generated from the external clock, due to limitations in conventional clock generation circuitry.

Emulation system constraints, therefore, commonly demand that external and internal clocks operate at the same speed, referred to as a "1:1 mode" or "PLL bypass mode." This, however, leads to complications. For example, frequently a chip is supposed to generate a response to some event within a certain number of external clock cycles. However, as described above, when not in 1:1 mode a certain number of external clock cycles ordinarily corresponds to a larger number of internal clock cycles. When the chip is operating in 1:1 mode, the required response time may be inadequate as measured in terms of the now slower, internal clock. Therefore, a need exists for improvements in the capability of chips to operate responsive to a slowed down clock.

SUMMARY

In one aspect, according to a method form, a method for performing clocked operations in a device includes performing, in a device, first and second operations responsive to a clock having a primary frequency f. The device is capable of performing the operations within X and Y cycles of the clock, respectively. X cycles of the clock correspond to a time interval T1 with the clock operating at the frequency f, and, accordingly, the device is capable of performing X/Y instances of the second operation within time interval T1 with the clock operating at the frequency f. During the time interval T1 at least one extra cycle of the clock is generated to reduce performance time for the first operation. An affect of the at least one extra cycle is masked with respect to the second operation, so that instances of the second operation during the interval T1 remain no greater in number than X/Y.

Other forms and aspects, as well as advantages and objects of the invention will become apparent upon reading the following detailed description and upon reference to the accompanying drawings.

DETAILED DESCRIPTION OF PREFERRED EMBODIMENT

The claims at the end of this application set out novel features which applicants believe are characteristic of the invention. The invention, a preferred mode of use, further objectives and advantages, will best be understood by reference to the following detailed description of an illustrative embodiment read in conjunction with the accompanying drawings.

Figure 1:
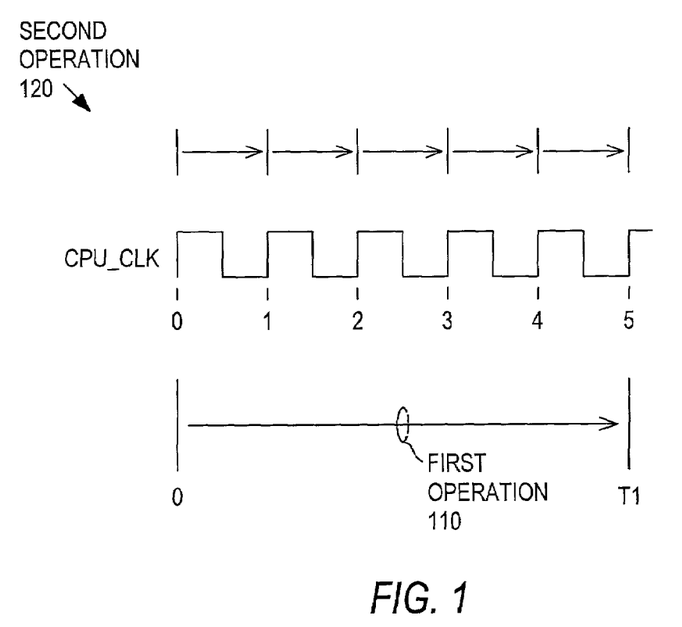
FIG. 1 illustrates timing of a first and second operation responsive to a clock, according to an embodiment of the present invention.

FIG. 1 illustrates timing of a first and second operation responsive to a clock, according to an embodiment of the present invention. In a device (not shown) first and second operations 110 and 120 respectively are performed responsive to a clock CPU_CLK of a certain frequency, as shown, which will be referred to herein as frequency f. (The CPU_CLK may also be referred to herein as a "timing clock" to distinguish it from other clock signals that are selectively used to provide the CPU_CLK.) As shown, the device is capable of performing the first operation 110 within 5 cycles of the clock, and the second operation within 1 cycle. Thus, during 5 cycles of the clock corresponding to a time interval T1 (with the clock operating at the frequency f) one instance of the first operation 100 is performed and 5 instances of the second operation 120 are performed, as shown.

Figure 2:
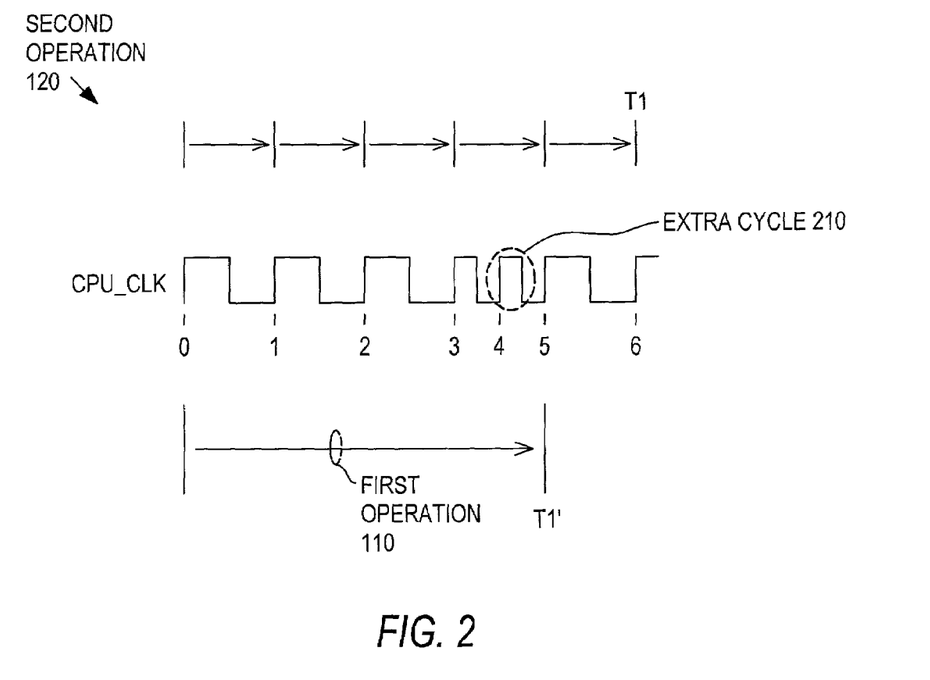
FIG. 2 illustrates timing of a first and second operation responsive to the clock with an extra clock cycle inserted, according to an embodiment of the present invention.

FIG. 2 illustrates timing of a first and second operation responsive to the clock CPU_CLK with an extra clock cycle inserted, according to an embodiment of the present invention. Once again, in a device (not shown) first and second operations 110 and 120 respectively are performed responsive to the clock CPU_CLK, and once again the device is capable of performing the first operation 110 within 5 cycles of the clock, and the second operation within 1 cycle. As before, clock CPU_CLK has a certain primary frequency f, but in FIG. 2 at least one extra clock cycle 210 is generated during the time T1, so that performance time for the first operation 110 is reduced to time T1', as shown. In the particular example, the extra clock cycle 210 is added after the fourth rising edge of CPU_CLK (counting clock edge 0). Prior to the extra clock cycle 210, the previous rising edges of the CPU_CLK, i.e., edges 0, 1, 2 and 3, occur at the primary frequency f. Likewise, after the extra clock cycle 210, the succeeding rising edges of the CPU_CLK, i.e., edges 5, 6 and so on, occur at the primary frequency f. The extra clock cycle 210, however, is shortened, i.e., of a higher frequency. Moreover, inserting the extra clock cycle 210 correspondingly shortens the duration of the CPU_CLK cycle immediately preceding the extra cycle 210, i.e. the cycle beginning with rising edge 3, as shown.

Ordinarily, inserting the extra clock cycle 210 would influence performance of the second operation 120 as well. This may, however, be undesirable as will be further described in connection with other FIG's below. Therefore, according to the illustrated embodiment, an affect of the extra cycle 210 is masked with respect to the second operation 120, so that instances of the second operation 120 during the interval T1 remain no greater in number than without the extra cycle 210.

To generalize, the device for which operations are shown in FIGS. 1 and 2 is capable of performing the operations 110 and 120 within X and Y cycles of the clock, respectively. X cycles of the CPU_CLK correspond to a time interval T1 with the clock operating at the frequency f. Accordingly, the device is capable of performing X/Y instances of the second operation within time interval T1 with the clock operating at the frequency f. By generating, during the time interval T1, at least one extra cycle 210 of the CPU_CLK, performance time for the first operation 110 is reduced to T1'. But an affect of the at least one extra cycle 210 is masked with respect to the second operation, so that instances of the second operation 120 during the interval T1 remain no greater in number than X/Y.

Figure 3:
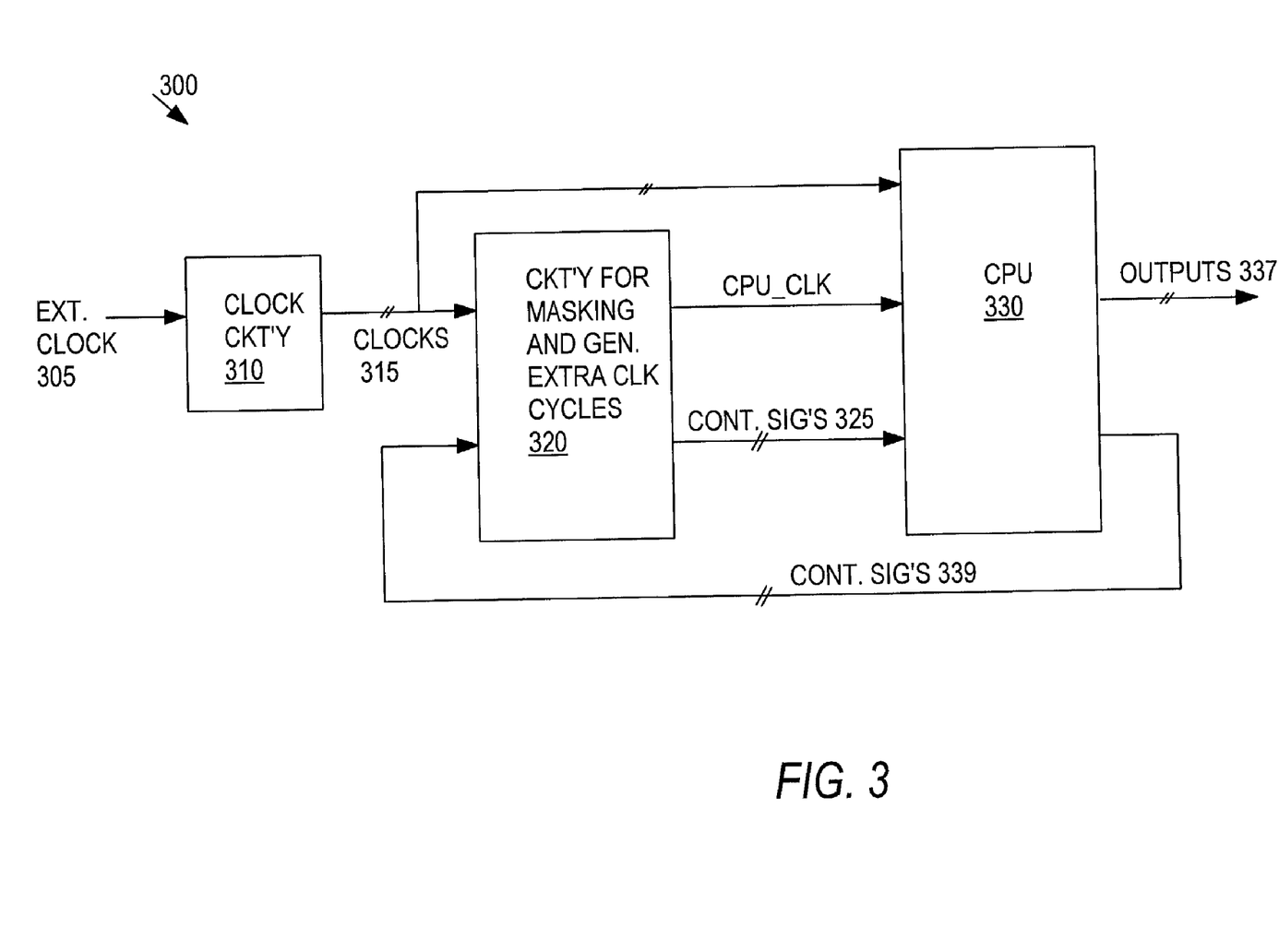
FIG. 3 illustrates a central processing unit ("CPU"), according to an embodiment of the present invention.

FIG. 3 illustrates a system, according to an embodiment of the present invention. The system 300 either generates or receives an external clock 305, as shown. The external clock 305 is received by clock circuitry 310, which generates other clock signals 315 from the clock 305, including clock signals (not explicitly shown in FIG. 3) at a higher frequency than the clock 305. One or more of these clock signals 315 output by clock circuitry 310 are received by circuitry 320 for processing. Circuitry 320 generates a clock signal CPU_CLK which may selectively have extra clock cycles, such as extra cycle 210 shown in FIG. 2. System 300 also has a central processing unit ("CPU") 330, which receives the clock signals 315 from clock circuitry 310 and the special clock signal CPU_CLK from circuitry 320. At least some of the CPU operations performed by CPU 330 generate data 337 and control signals 339, as shown. Likewise, at least some of the CPU operations of circuitry 330 are performed responsive to data and control signals, including but not necessarily limited to those control signals explicitly shown in FIGS. 4, 5 and 7. Responsive to the control signals 339 received from circuitry 330, circuitry 320 selectively generates the extra clock cycles in CPU_CLK and also generates control signals 325 that selectively mask the effect for circuitry 330 of the extra cycles.

Figure 4:
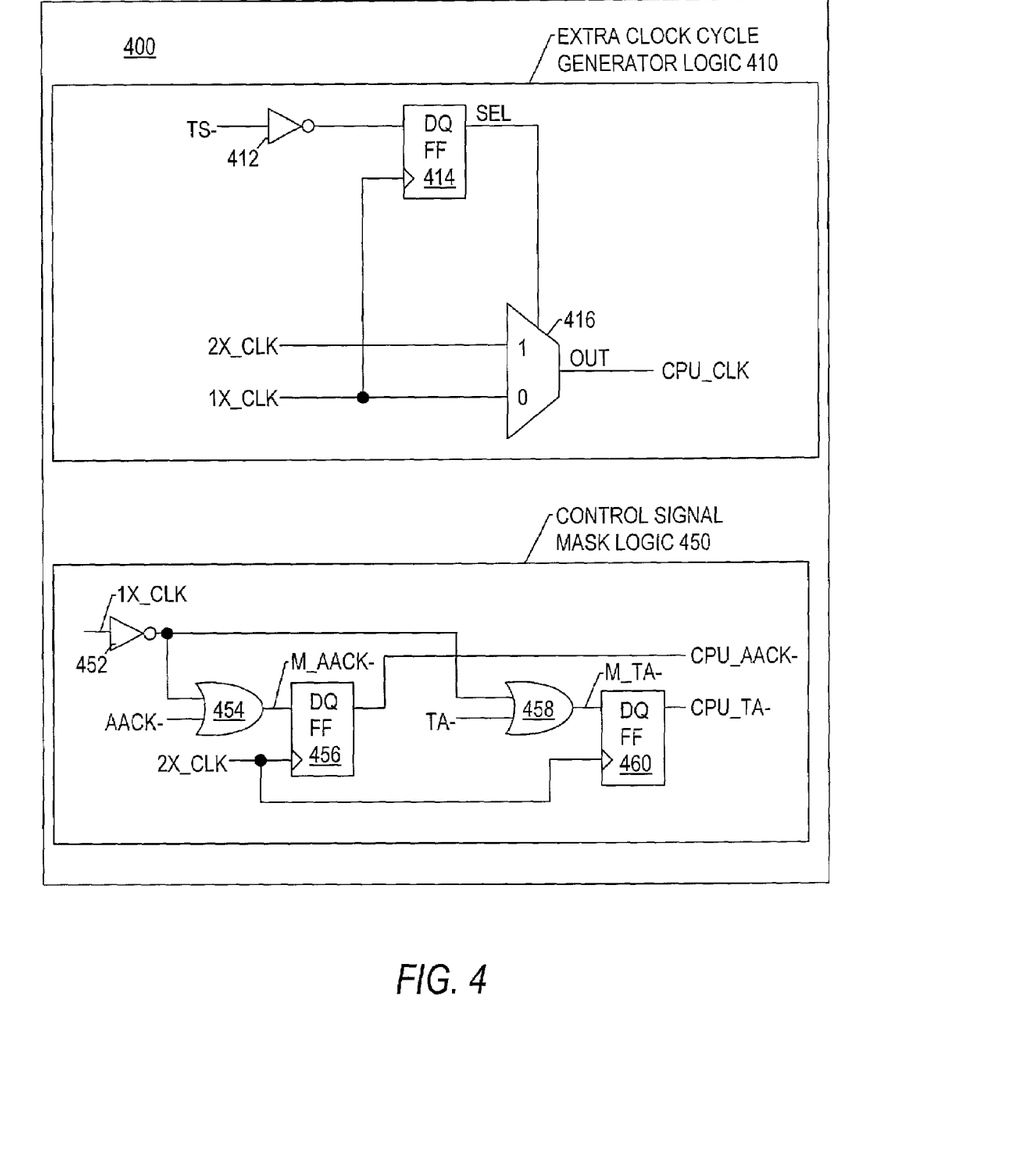
FIG. 4 illustrates logic for masking one or more control signals and for generating at least one extra clock cycle, according to an embodiment of the present invention.

FIG. 4 illustrates logic 400 for circuitry 320 of FIG. 3, for masking one or more control signals and for generating a clock signal with at least one extra clock cycle, according to an embodiment of the present invention. The logic 400 includes logic 410 for selectively generating the extra clock cycles, and logic 450 for selectively generating masked control signals.

The logic 410 receives clock signals 315 (FIG. 3), including 2X_CLK and 1X_CLK, as shown in FIG. 4. The logic 410 also receives control signals 339 (FIG. 3), including an extra-clock-cycle-initiating control signal TS-, as shown in FIG. 4. The control signal TS- is received by inverter 412, the output of which is received by the latch 414. The latch 414 output selects which one of the clock signals is passed through by multiplexer 416 to be output as CPU_CLK.

The logic 450 likewise receives clock signals 315 (FIG. 3), including 2X_CLK and 1X_CLK, as shown. The logic 450 also receives control signals 339 (FIG. 3), including control signal TA- and AACK-, as shown. The 1X_CLK signal is received by inverter 452, the output of which is passed to OR gates 454 and 458. OR gates 454 and 458 also receive control signals AACK- and TA-, respectively. The outputs of OR gates 454 and 458 feed respective latches 456 and 460, which are clocked by the 2X_CLK. The output of latch 456 is thus a selectively masked version of control signal AACK-. Likewise, the output of latch 460 is thus a selectively masked version of control signal TA-.

Figure 5:
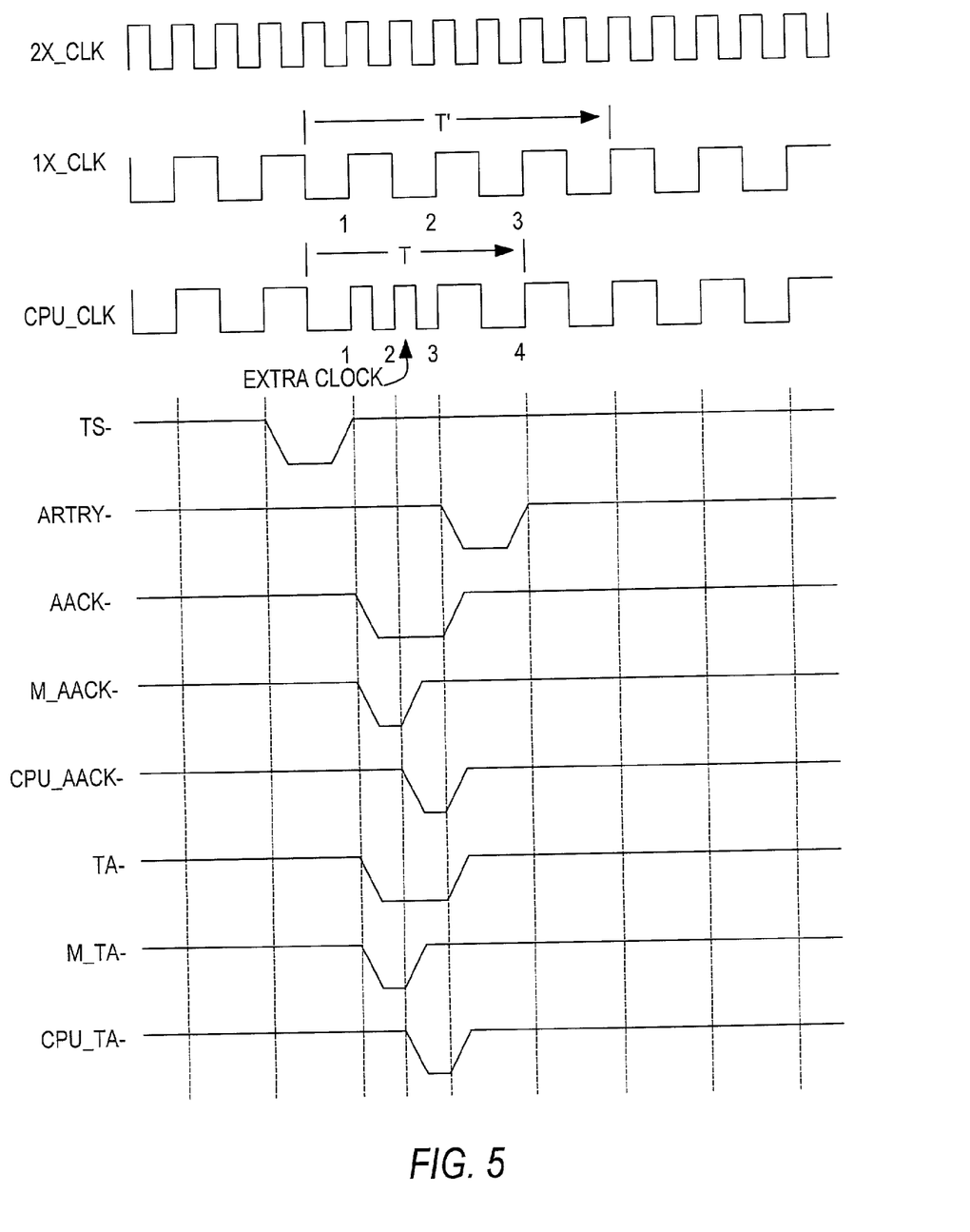
FIG. 5 illustrates operations for the logic circuitry of FIG. 4, according to an embodiment of the present invention.

FIG. 5 illustrates sequence and timing of operations for the circuitry 300 of FIG. 3, according to an embodiment of the present invention. A TS- signal initiates an address cycle in CPU 330 (FIG. 3). Responsive to the TS- signal, as shown, the 2X_CLK is selected by multiplexer 416 (FIG. 4) to be output by circuitry 330 as the CPU_CLK to CPU 330, as shown. More specifically, the SEL signal (FIG. 4) which causes the multiplexer 416 (FIG. 4) to select this output for CPU_CLK is asserted by the latch 414 (FIG. 4) responsive to the TS- signal during the cycle of the 1X_CLK immediately following the cycle during which the TS- signal is asserted. (It should be understood that the term "asserted" is a relative term, and that in the illustrated instance a low signal is logically considered to be an asserted signal.)

An effect of the above is to insert an extra clock cycle and shorten the clock cycle immediately preceding, as shown for CPU_CLK. In turn, the effect of the extra clock cycle is to reduce performance time for a first operation, which in the illustrated instance is an address retry operation. The performance time for the address retry operation is indicated by the time from assertion of the TS- signal to assertion of the ARTRY-, as shown. That is, the address retry operation requires four clock cycles. With the CPU_CLK operating at its primary frequency of the 1X_CLK, the address retry operation would have been performed within a time interval T, as shown, i.e., four cycles of the 1X_CLK. However, with the inserted clock cycle having a shorter period, and the shortening of the period of the cycle immediately preceding the extra clock cycle, the address retry operation is performed in processor 300 within a shorter time interval T', as shown, i.e., three cycles of the 1X_CLK.

Certain effects of the extra cycle may have to be masked, however. In the illustrated example of FIG. 5, a second operation occurs during the address cycle, which in the illustrated instance is a data transfer operation triggered by a data transfer control signal TA- occurring in conjunction with assertion of the CPU_CLK, as shown. The TA- signal may be referred to herein as an operating-initiating control signal. If this control signal is not altered, the extra cycle in CPU_CLK will result in this TA- control signal extending over the course of more than one rising of the CPU_CLK, which would cause an extra data transfer to occur. To avoid this, the inverter 452 output and the TA- signal are combined by the OR gate 458 (FIG. 4) to provide a shortened control signal M_TA-, as shown. The timing of this shortened control signal is controlled by latch 460 (FIG. 4) to align the shortened control signal M_TA- with the extra clock cycle, as control signal CPU_TA-, as shown, so that only one rising edge of CPU_CLK occurs during CPU_TA-.

Likewise, in the illustrated example of FIG. 5, a third operation occurs during the address cycle, which in the illustrated instance is an acknowledgment operation. The performance time for the acknowledgment operation is indicated by the time from assertion of the TS- signal to assertion of an acknowledgment control signal AACK-, as shown. If the control signal is not altered, the extra cycle in CPU_CLK will result in the AACK- control signal extending over the course of more than one rising of the clock. To avoid this, the inverter 452 output and the AACK- signal are combined by the OR gate 454 (FIG. 4) to provide a shortened control signal M_AACK-, as shown. The timing of this shortened control signal is controlled by latch 456 (FIG. 4) to align the shortened control signal M_AACK- with the extra clock cycle, as control signal CPU_AACK-, as shown, so that only one rising edge of CPU_CLK occurs during CPU_AACK-.

As a consequence of the above, the CPU 330 may share the 1X_CLK with an external device, such as a bus, that requires that an operation, such as the illustrated address cycle, be performed within three cycles of the shared 1X_CLK. From the perspective of the bus the CPU satisfies the three clock cycle constraint, but from the perspective of the CPU the operation is still performed in four cycles of the CPU_CLK. This arrangement is well suited to address the emulation and testing needs described earlier, according to which the external clock, e.g., the 1X_CLK, serves as a reference to both an actual chip, e.g., the CPU 330 (FIG. 3), and an emulated chip. As previously described, in this application the CPU internal clocks cannot be generated at their normal high frequency from the external clock, due to the slow speed of the external clock during the emulation and testing. Therefore the external and internal clocks are made to temporarily operate, for the most part, at the same primary frequency. According to the present embodiment, however, extra clock cycles are selectively added to the CPU_CLK, and so on, so that the CPU can generate a response to some event within a required number of external clock cycles, while other effects of the extra cycles are selectively masked.

Figure 6:
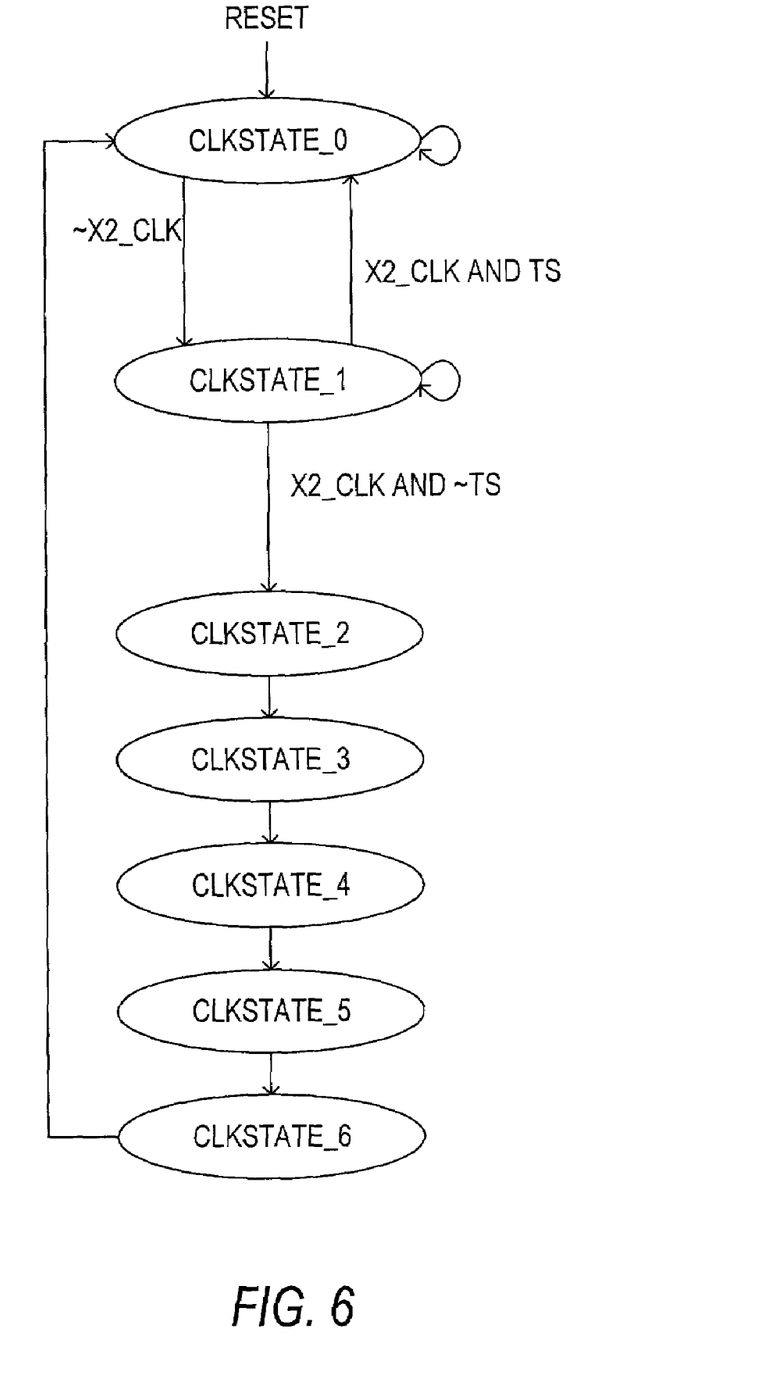
FIG. 6 illustrates a state machine, according to an embodiment of the present invention.
Figure 7:
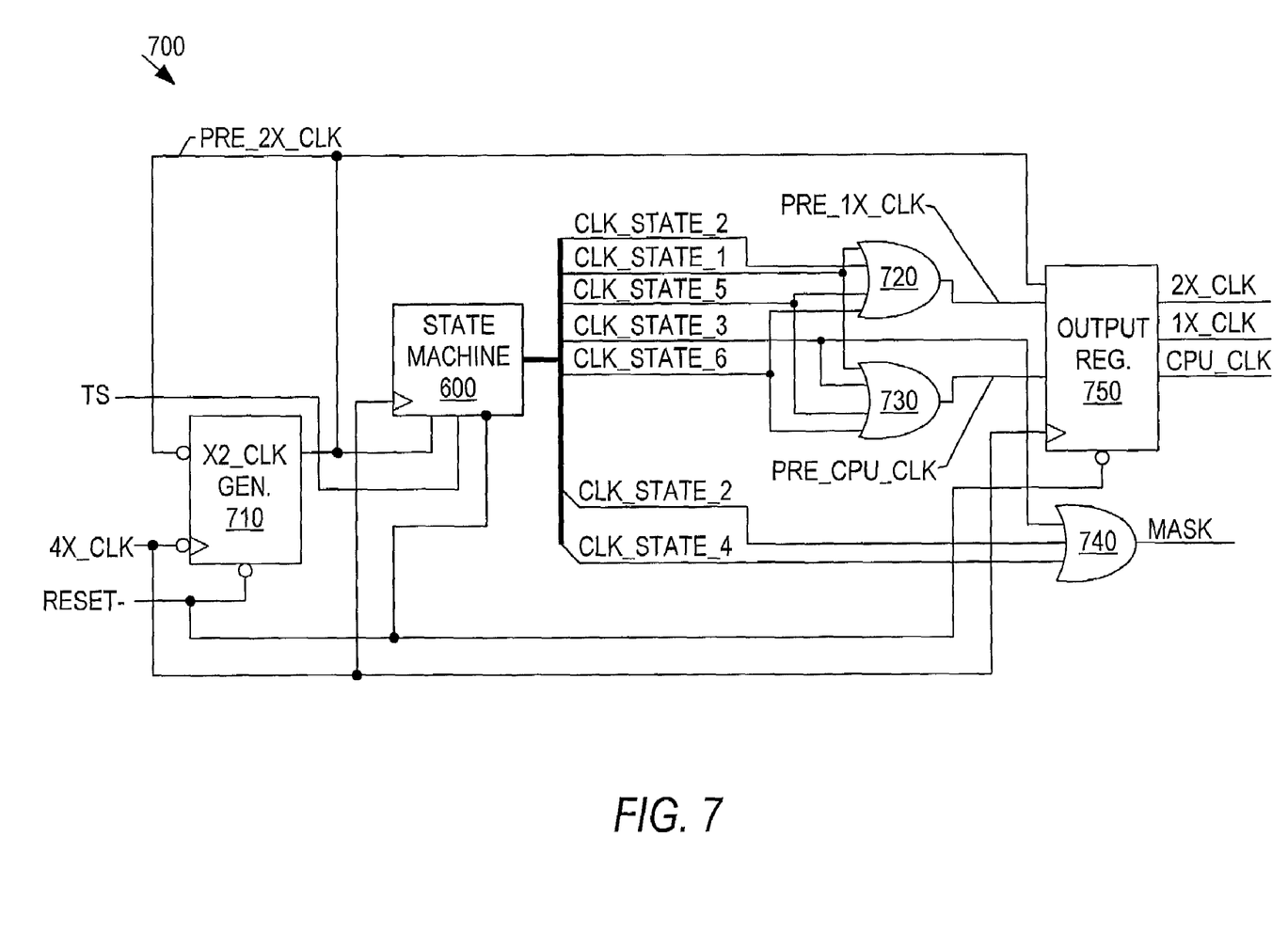
FIG. 7 illustrates circuitry for masking one or more control signals and for generating at least one extra clock cycle, according to another embodiment of the present invention.

FIG. 7 illustrates another embodiment of logic for circuitry 320 of FIG. 3, for masking one or more control signals and for generating a clock signal with at least one extra clock cycle. Logic 700 receives, as inputs, the TS- control signal illustrated in FIG. 5, a reset signal RESET-, and a clock signal 4X_CLK having a frequency four times that of the 1X_CLK illustrated in FIG. 5. Logic 700 generates, as outputs, the 1X_CLK, 2X_CLK and CPU_CLK signals illustrated in FIG. 5, as well as a masked control signal MASK. This MASK signal is used as an input to an OR gate to qualify a signal such as the acknowledgment signal AACK- and the address cycle signal TA-, as is done in gates 454 and 458 in the mask logic 450 of FIG. 4. Logic 700 includes a 2X_CLK generator 710 that receives the 4X_CLK signal and the reset signal RESET-, and responsive to these inputs generates a clock signal, PRE_2X_CLK, having a frequency one-half that of the 4X_CLK signal. Logic 700 also includes a state machine 600 clocked by the 4X_CLK that generates six binary clock states, CLK_STATE_1 through CLK_STATE_6, responsive to the TS- control signal, the reset signal RESET-, the PRE_2X_CLK and the 4X_CLK. Details of state machine 600 are illustrated in FIG. 6, and will be described further below.

Clock states 1, 2, 5 and 6 are received by an OR gate 720 in logic 700. Clock states 1, 3, 5 and 6 are received by an OR gate 730 in logic 700. Clock states 2, 3 and 4 are received by an OR gate 740 in logic 700. OR gate 720 outputs PRE_1X_CLK. OR gate 730 outputs PRE_CPU_CLK. OR gate 740 outputs the MASK signal. PRE_2X_CLK, PRE_1X_CLK and PRE_CPU_CLK are received by output register 750, which is clocked by 4X_CLK and reset by RESET-. The output register 750 outputs the 1X_CLK, 2X_CLK and CPU_CLK signals illustrated in FIG. 5. As a consequence of this arrangement, the logic 700 inserts extra clock cycles in the CPU_CLK responsive to the TS- signal, as shown in FIG. 4, and generates a MASK control signal. FIG. 6 illustrates an embodiment of a state machine 600 for the logic 700 of FIG. 7. In an embodiment of circuitry for this logic, each state is implemented as a flip-flop, and accordingly if the state machine 600 is "in" a particular state, say CLK_STATE_1, then the output for that state's flip-flop is asserted. Otherwise, the output for that flip-flop is deasserted.

As shown in FIG. 7, the state machine 600 is clocked by the 4X_CLK. Referring again now to FIG. 6, once the state machine 600 is in CLK_STATE_2, with each tick of the 4X_CLK it moves from CLK_STATE_2 to CLK_STATE_3, from CLK_STATE_3 to CLK_STATE_4, from CLK_STATE_4 to CLK_STATE_5, from CLK_STATE_5 to CLK_STATE_6, and from CLK_STATE_6 to CLK_STATE_0. The state machine 600 enters clock state 0 upon reset, or after CLK_STATE_6.

When the state machine 600 is in CLK_STATE_0 it stays there unless the 2X_CLK is deasserted, in which case the state machine goes to CLK_STATE_1. Unless the TS signal is deasserted, once the state machine is in CLK_STATE_1 it stays there unless the 2X_CLK is deasserted, in which case the state machine goes back to CLK_STATE_0. If in CLK_STATE_1 and the TS and 2X_CLK signals are asserted, the state machine goes to CLK_STATE_2.

Following is code for implementing the logic shown and described for FIGS. 6 and 7 as a computer program, according to an embodiment of the invention.

```
*/          Computer Code for Masking and Generating Extra Clock Cycles
**
**          CLOCK FPGA
**
**          GENERATES 2X_CLK, CPU_CLK, 1X_CLK
**
**
**
*/
'DEFINE     CLKSTATE_0   0
'DEFINE     CLKSTATE_1   1
'DEFINE     CLKSTATE_2   2
```

-continued

```
'DEFINE        CLKSTATE_3    3
'DEFINE        CLKSTATE_4    4
'DEFINE        CLKSTATE_5    5
'DEFINE        CLKSTATE_6    6
MODULE CLOCK_FPGA
[
//      CLOCK AND RESET INPUTS
SWITCH_IN
RESET
4X_CLK
PCI_OSC
PCI_RESET
TS
//      CLOCK AND RESET OUTPUTS
0_2X_CLK
0_CPU_CLK
0_1X_CLK
RESET
MASK
INPUT       SWITCH_IN
INPUT       RESET
INPUT       4X_CLK
INPUT       PCI_OSC
INPUT       PCI_RESET
INPUT       TS
OUTPUT      0_CPU_CLK
OUTPUT      0_1X_CLK
OUTPUT      0_2X_CLK
OUTPUT      MASK
REG         [6:0]         CLK_STATE, NEXT_CLK_STATE;
REG                       O_2X_CLK, O_1X_CLK, O_CPU_CLK;
REG                       1X_CLK, CPU_CLK, 2X_CLK;
WIRE PRE_2X_CLK, PRE_CPU_CLK, PRE_1X_CLK;
WIRE MASK;
WIRE CLK_STATE_0 = CLK_STATE['CLKSTATE_0];
WIRE CLK_STATE_1 = CLK_STATE['CLKSTATE_1];
WIRE CLK_STATE_2 = CLK_STATE['CLKSTATE_2];
WIRE CLK_STATE_3 = CLK_STATE['CLKSTATE_3];
WIRE CLK_STATE_4 = CLK_STATE['CLKSTATE_4];
WIRE CLK_STATE_5 = CLK_STATE['CLKSTATE_5];
WIRE CLK_STATE_6 = CLK_STATE['CLKSTATE_6];
// VECTORS FOR 2X_CLK, 1X_CLK AND CPU_CLK
ASSIGN PRE_2X_CLK = 2X_CLK;
ASSIGN PRE_1X_CLK = CLK_STATE_1 CLK_STATE_2 CLK_STATE_5 CLK_STATE_6;
ASSIGN PRE_CPU_CLK = CLK_STATE_1 CLK_STATE_3 CLK_STATE_5 CLK_STATE_6;
ASSIGN MASK = CLK_STATE_2 CLK_STATE_3 CLK_STATE_4; //MASKS 1 AND 1/2 CPU_CLK'S
//
// GENERATE 2X_CLK
//
ALWAYS @ (P:EDGE 4X_CLK]
        IF ~RESET)
                2X_CLK <= #10 0;
        ELSE    2X_CLK <= #10 ~2X_CLK;
//
// GENERATE PROCESSOR CLOCK AND METEORITE CLOCK
//
ALWAYS @ (P:EDGE 4X_CLK]
        IF ~RESET)  CLK_STATE <= #2 6'B0;
        ELSE        CLK_STATE <= #2 NEXT_CLKSTATE;
// NEXT STATE GENERATOR
ALWAYS @ (CLK_STATE OR 2X_CLK OR TS)
BEGIN
        NEXT_CLK_STATE = 7'B0;
        CASE (1'B1)
        CLK_STATE['CLKSTATE_0]:
                IF (~2X_CLK)        NEXT_CLK_STATE['CLKSTATE_1] = 1;
                ELSE                NEXT_CLK_STATE['CLKSTATE_0] = 1;
        CLK_STATE['CLKSTATE_1]:
                IF (~2X_CLK)        NEXT_CLK_STATE['CLKSTATE_0] = 1;
                ELSE
                IF (2X_CLK & ~TS)   NEXT_CLK_STATE['CLKSTATE_2] = 1;
                ELSE
                                    NEXT_CLK_STATE['CLKSTATE_1] = 1;
        CLK_STATE['CLKSTATE_2]:
                                    NEXT_CLK_STATE['CLKSTATE_3] = 1;
        CLK_STATE['CLKSTATE_3]:
                                    NEXT_CLK_STATE['CLKSTATE_4] = 1;
        CLK_STATE['CLKSTATE_4]:
                                    NEXT_CLK_STATE['CLKSTATE_5] = 1;
```

```
            CLK_STATE['CLKSTATE_5]:
                                            NEXT_CLK_STATE['CLKSTATE_6] = 1;
            CLK_STATE['CLKSTATE_6]:
                                            NEXT_CLK_STATE['CLKSTATE_0] = 1;
            DEFAULT:                    NEXT_CLK_STATE['CLKSTATE_0] = 1;
            ENDCASE
END
//
//          REGISTER ALL OUTPUTS
//
            ALWAYS @ (POSEDGE 4X_CLK)
            BEGIN
            IF ( - RESET )
              BEGIN
              O_2X_CLK    <= 0;
              O_CPU_CLK   <= 0;
              O_1X_CLK    <= 0;
              END
            ELSE
              BEGIN
              O_2X_CLK    <= PRE_2X_CLK;
              O_CPU_CLK   <= PRE_CPU_CLK;
              O_1X_CLK    <=PRE_1X_CLK;
              END
            END
ENDMODULE
```

The description of the present embodiment has been presented for purposes of illustration, but is not intended to be exhaustive or to limit the invention to the form disclosed. Many additional aspects, modifications and variations are also contemplated and are intended to be encompassed within the scope of the following claims. For example, it is important to note that while the present invention has been described primarily in the context of a hardware implementation, those of ordinary skill in the art will appreciate that at least certain aspects of the circuitry 320 (FIG. 3) may be implemented as a data processing system. Furthermore, processes of the present invention, such as set out in the computer code above, are capable of being distributed in the form of a computer readable medium of instructions in a variety of forms. The present invention applies equally regardless of the particular type of signal bearing media actually used to carry out the distribution. Examples of computer readable media include RAM, flash memory, recordable-type media, such a floppy disk, a hard disk drive, a ROM, and CD-ROM, and transmission-type media such as digital and analog communications links, e.g., the Internet.

Although an occasion that has been described herein for a slowed down clock concerns emulation and testing, it should be understood that there are other occasions for slowing down a clock. For example, a processor clock may be slowed to reduce power consumption. Furthermore, although the invention has been described as addressing issues that arise from a slowed down clock, it should also be understood that the invention has other applications that may address other issues. For example, even with a device clock operating at a normal speed, performance time for one process may occasionally need to be reduced by inserting one or more higher frequency clock cycles, but without influencing the performance of another process. The invention has applications in these and other circumstances as well.

Although a system 300 (FIG. 3) including a CPU 330 has been illustrated herein, it should be understood that the system is applicable for other devices besides, or in addition to a CPU, such as application specific integrated circuitry, for example. To reiterate, the description of the present embodiment has been presented for purposes of illustration, but is not intended to be exhaustive or to limit the invention to the form disclosed. Many additional aspects, modifications and variations are also contemplated and are intended to be encompassed within the scope of the following claims.

What is claimed is:

1. A method for performing clocked operations in an electronic device, the method comprising the steps of:
   performing, in the electronic device, first and second operations responsive to a timing clock having a primary frequency f, wherein the electronic device is capable of performing the operations within X and Y cycles of the clock, respectively, and wherein X cycles of the clock correspond to a time interval T1 with the clock operating at the primary frequency f, and, accordingly, the device is capable of performing X/Y instances of the second operation within time interval T1 with the clock operating at the primary frequency f;
   generating, during the time interval T1, at least one extra cycle of the clock, to selectively reduce performance time for the first operation; and
   masking a certain effect of the at least one extra cycle of the clock for the second operation, so that instances of the second operation during the interval T1 remain no greater in number than X/Y,
   wherein a first clock signal has the primary frequency f and a second clock signal has a frequency greater than the primary frequency f, and wherein generating the at least one extra cycle of the clock comprises selecting, during some of the time T1, the second clock signal for output as the timing clock,
   wherein instances of the second operation are initiated by asserting an operation-initiating control signal in conjunction with asserting the timing clock, and wherein masking the effect of the at least one extra cycle of the clock comprises altering timing of the control signal, so that assertion of the control signal occurs during a different time interval than does assertion of the at least one extra cycle of the clock.

2. The method of claim 1, wherein a third clock signal has a frequency greater than the frequency of the second clock signal, the method comprising clocking a state machine by the third clock signal.

3. The method of claim 2, wherein initiating the at least one extra cycle of the clock includes asserting an extra-clock-cycle-initiating control signal as an input to the state machine.

4. The method of claim 2, the method comprising clocking an output register by the third clock signal.

5. The method of claim 4, wherein initiating the least one extra cycle of the clock includes asserting an extra-clock-cycle-initiating control signal as an input to the output register.

6. The method of claim 2, wherein an output register outputs the timing clock responsive to output signals of the state machine.

7. The method of claim 6, wherein the output register outputs a mask signal for masking the certain effect of the at least one extra cycle of the clock responsive to output signals of the state machine.

8. An apparatus for performing clocked operations comprising:
   first circuitry for performing first and second operations responsive to a timing clock having a primary frequency f, wherein the first circuitry is capable of performing the operations within X and Y cycles of the clock, respectively, and wherein X cycles of the clock correspond to a time interval T1 with the clock operating at the primary frequency f, and, accordingly, the first circuitry is capable of performing X/Y instances of the second operation within time interval T1 with the clock operating at the primary frequency f; and
   second circuitry for generating, during the time interval T1, at least one extra cycle of the clock, to reduce performance time for the first operation, and for masking an affect of the at least one extra cycle of the clock with respect to the second operation, so that instances of the second operation during the interval T1 remain no greater in number than X/Y,
   wherein a first clock signal has the primary frequency f and a second clock signal has a frequency greater than the primary frequency f, and wherein the second circuitry comprises circuitry for selecting, during some of the time T1,the second clock signal for output as the timing clock,
   wherein the first circuitry is operable to initiate instances of the second operation responsive to an operation-initiating-control signal asserted in conjunction with the timing clock, and wherein the second circuitry is operable to alter timing of the control signal, so that assertion of the control signal occurs during a different time interval than does assertion of the at least one extra cycle of the clock.

9. The apparatus of claim 8, wherein a third clock signal has a frequency greater than the frequency of the second clock signal, and the second circuitry comprises a state machine clocked by the third clock signal.

10. The apparatus of claim 9, wherein the second circuitry is operable to initiate the at least one extra cycle of the clock responsive to an extra-clock-cycle-initiating control signal input to the state machine.

11. The apparatus of claim 9, wherein the second circuitry comprises an output register clocked by the third clock signal.

12. The apparatus of claim 11, wherein the second circuitry is operable to initiate the at least one extra cycle of the clock responsive to an extra-clock-cycle-initiating control signal input to the output register.

13. The apparatus of claim 9, wherein the second circuitry comprises an output register operable to output the timing clock responsive to output signals of the state machine.

14. The apparatus of claim 13, wherein the output register is operable to output a mask signal for masking the certain effect of the at least one extra cycle of the clock responsive to output signals of the state machine.

15. A computer program product for performing clocked operations in an electronic device, wherein the electronic device is operable to perform first and second operations responsive to a timing clock having a primary frequency f, the electronic device being capable of performing the operations within X and Y cycles of the clock, respectively, and wherein X cycles of the clock correspond to a time interval T1 with the clock operating at the primary frequency f, and, accordingly, the device is capable of performing X/Y instances of the second operation within time interval T1 with the clock operating at the primary frequency f, the computer program product comprising:
   first instructions for generating, during the time interval T1, at least one extra cycle of the clock, to selectively reduce performance time for the first operation; and
   second instructions for masking a certain effect of the at least one extra cycle of the clock for the second operation, so that instances of the second operation during the interval T1 remain no greater in number than X/Y,
   wherein a first clock signal has the primary frequency land a second clock signal has a frequency greater than the primary frequency f, and wherein first instructions for generating the at least one extra cycle of the clock comprise instructions for selecting, during some of the time T1, the second clock signal for output as the timing clock,
   wherein instances of the second operation are initiated in the device by asserting an operation-initiating control signal in conjunction with asserting the timing clock, and wherein the second instructions comprise instructions for altering timing of the control signal, so that assertion of the control signal occurs during a different time interval than does assertion of the at least one extra cycle of the clock.

* * * * *

UNITED STATES PATENT AND TRADEMARK OFFICE
CERTIFICATE OF CORRECTION

| | |
|---|---|
| PATENT NO. | : 6,981,166 B2 |
| APPLICATION NO. | : 10/042104 |
| DATED | : December 27, 2005 |
| INVENTOR(S) | : Robert Christopher Dixon, Alan Grant Singletary and Barry Joe Wolford |

Page 1 of 1

It is certified that error appears in the above-identified patent and that said Letters Patent is hereby corrected as shown below:

Col. 11 claim 5, line 1, which reads, "The method of claim 4, wherein initiating the least one" should read -- The method of claim 4, wherein initiating the at least one --.

Signed and Sealed this

Twenty-second Day of August, 2006

JON W. DUDAS
*Director of the United States Patent and Trademark Office*